(12) United States Patent
Yamamoto

(10) Patent No.: US 8,493,287 B2
(45) Date of Patent: Jul. 23, 2013

(54) HEAD MOUNTED DISPLAY DEVICE AND IMAGE DISPLAY DEVICE

(75) Inventor: Masao Yamamoto, Tokyo (JP)

(73) Assignee: Scalar Corporation, Tokyo (JP)

( * ) Notice: Subject to any disclaimer, the term of this patent is extended or adjusted under 35 U.S.C. 154(b) by 653 days.

(21) Appl. No.: 12/440,658

(22) PCT Filed: Sep. 11, 2007

(86) PCT No.: PCT/JP2007/068025
§ 371 (c)(1),
(2), (4) Date: Nov. 16, 2009

(87) PCT Pub. No.: WO2008/032854
PCT Pub. Date: Mar. 20, 2008

(65) Prior Publication Data
US 2010/0103076 A1      Apr. 29, 2010

(30) Foreign Application Priority Data
Sep. 11, 2006    (JP) .................................. 2006-245551

(51) Int. Cl.
*G09G 5/00* (2006.01)
(52) U.S. Cl.
USPC ................. 345/8; 359/630; 351/158; 349/13
(58) Field of Classification Search
USPC ..................... 345/7, 8; 359/630–633; 351/41, 351/158; 349/11, 13
See application file for complete search history.

(56) References Cited

U.S. PATENT DOCUMENTS

| 4,869,575 A * | 9/1989 | Kubik .............................. 345/8 |
| 6,023,372 A * | 2/2000 | Spitzer et al. .................. 359/630 |
| 2004/0156114 A1* | 8/2004 | Sayed et al. .................. 359/630 |
| 2006/0119539 A1* | 6/2006 | Kato et al. ........................ 345/8 |

FOREIGN PATENT DOCUMENTS

| JP | 07-209600 | 8/1995 |
| JP | 2004-233782 A | 8/2004 |
| WO | WO 00/55676 | 9/2000 |

OTHER PUBLICATIONS

International Search Report Dated Oct. 9, 2007.
English language Abstracts of JP 07-209600 and JP 2004-233782 A.

* cited by examiner

*Primary Examiner* — Koosha Sharifi-Tafreshi
(74) *Attorney, Agent, or Firm* — Plumsea Law Group, LLC

(57) ABSTRACT

To improve a small image display device of the type to be attached to glasses so that positioning thereof can be made easily during use.
An image display device 100 comprises a body assembly 110 which can be fixed to a temple 210 of glasses 200, and an image display section 120 adapted to move from a standby position that is located close to the body assembly 110 to a service position just in front of lenses 220. The service position for the image display section 120 is previously determined, and the image display section 120 is automatically moved from the standby position to the service position. This allows the image display section 120 to be positioned at a proper position. The image display section 120 contains a display 125 and a free curved surface prism 126 therein. A user can view images enlarged from the images produced on the display 125 when the image display section 120 is at the service position.

18 Claims, 2 Drawing Sheets

HEAD MOUNTED DISPLAY DEVICE AND IMAGE DISPLAY DEVICE

TECHNICAL FIELD

The present invention relates to a small head mounted display device which can be used while being worn on a part of the body such as the head.

BACKGROUND OF THE INVENTION

Head mounted displays (HMDs), which are used while worn on a part of the body such as the head to place a video screen in front of each eye of the user, find applications in various fields including the field of virtual reality. Typical HMDs are designed to block out outside light and force the user to see only the HMD's pictures. It usually has a shape of a frame of goggles or large glasses. With an HMD used, the user can view images irrespective of the direction he or she faces but then again it gives the user visual isolation from the surrounding environment.

In recent years, small image display devices have been proposed that allow users to view images as well as the surrounding environment by means of presenting the images in a certain part of the field of vision.

The image display device of this type is disclosed in, for example, Japanese Patent Laid-open No. 7-209600. The image display device has a liquid crystal display (LCD), a reflecting mirror, an ocular lens and other components contained within a single housing. The housing has a clip attached thereto. This clip is used for mounting the image display device onto a frame of glasses or sunglasses. The housing is placed on top of the frame of the glasses over the outside surface of it. An image that is displayed on the LCD is directed to one eye of the user in a diagonal down direction through the reflecting mirror, the ocular lens, and the lens of the glasses.

The image display device of this type provides the user with a choice between seeing the surrounding environment and seeing images by the movement of the eyes. It has a high value in terms of its availability in everyday life at any place both inside and outside a building.

Accordingly, such an image display device may be used as a visual version of portable stereo headphones through which sound comes out and which has significantly changed the lifestyle of young people.

The image display device of this type is intended to be attached to existing glasses. In this case, the user manually attaches the image display device to the glasses himself or herself. However, positioning of the image display device is important in order to allow the user to view images. It is not so easy to properly position the image display device and attach it to the glasses.

In addition, the image display device as described above is expected to be often attached to and removed from the glasses because the user removes the image display device from the glasses when he or she doesn't want to use it, and attaches it to the glasses when he or she wants to use it. The difficulty in exact positioning of the image display device for the attachment to the glasses could be a cause of users' steering clear of using the image display device.

The present invention is for solving the aforementioned problem, and an object thereof is to provide a technique with which a user can use a head mounted display device without any difficulty in positioning of it.

SUMMARY OF THE INVENTION

The present inventor proposes the following head mounted display device and image display device below as the invention that can solve the aforementioned problem.

A head mounted display device of the present invention is as follows.

More specifically, the head mounted display device of the present invention comprises a main body and an image display section, the main body having a shape of a pair of glasses having two temples with which the glasses are fixed in place to a part of the body of a user, the image display section being attached to an attachment temple which is at least one of said two temples.

Said image display section of this head mounted display device is adapted to be positioned at a service position in front of one eye of the user which is located closer to said attachment temple when said main body is fixed to the part of the body of the user during the use of said head mounted display device, said image display section having display means that allows the user to view said image with the one eye, said image being presented within a display area which overlaps the field of vision of the one eye, by means of directing an imaging light of a predetermined image to said one eye, said image display section being movable between a standby position on the side of said attachment temple and said service position, in such a manner that said image display section is able to be positioned at said service position.

In this head mounted display device, two positions are expected: the service position in front of the main body having a glasses-like shape and the standby position on the side of the main body. The image display section having a function similar to that of a conventional image display device is moved between the two positions. The image display section that moves from the standby position to the service position is positioned at an appropriate position. Accordingly, the user will have no trouble in positioning the image display section when he or she uses the head mounted display device.

The position at which the image display section is positioned may be appropriately adjustable depending on differences among individuals for example. For example, the position at which the image display section is to be positioned may be determined when the head mounted display device is first used, and then the determined position is used as the service position for the image display section. The head mounted display device is automatically positioned to an appropriate position after the position at which the image display section is to be positioned is once determined.

In addition, the standby position may be slightly shifted upward or downward from the temple of the main body.

The image display section in the head mounted display device according to the present invention may be intended to be moved manually. Alternatively, it may be intended to be moved automatically. In addition, the head mounted display device of the present invention may be the one wherein the image display section is moved manually in one direction and automatically in the other direction, between the standby position and the service position. Automatic movement of the image display section would be convenient for users.

The head mounted display device of the present invention may comprise, for example, a switch, and a driving mechanism that generates a driving force in response to the operation of said switch, said image display section being adapted to move from said standby position to said service position by means of the driving force generated by said driving mechanism when said switch is operated. This makes it possible to provide an image display section that can be moved automatically.

The driving mechanism may be a component that uses electricity as the source of its driving force, such as a motor or an actuator. Alternatively, the driving mechanism may be a component that uses energy other than electricity as the source of its driving force, such as a coil or a spring.

The switch may be provided on other position than the portion of the head mounted display device to be mounted on the head of the user, such as on a remote controller. The image display section may be adapted to move from said service position to said standby position by using the driving force generated by said driving mechanism when the switch (this switch may be the same as or different from the aforementioned switch) is operated.

The head mounted display device having the driving mechanism according to the present invention may comprise a rail extending from said standby position to said service position, and a bendable rod-shaped component which moves along the rail by means of the driving force generated by said driving mechanism, the rod-shaped component having said image display section attached thereto at a distal end thereof. In such a case, said image display section may be adapted to move from said standby position to said service position according to the movement of said rod-shaped component.

The image display section may sometimes be required to change its orientation between when it is positioned at the standby position and when it is positioned at the service position. The aforementioned rail facilitates this change in orientation.

Said image display section may be attached to the distal end of said rod-shaped component in such a manner that the angle formed between said image display section and said rod-shaped component can be varied. This makes it possible to change the angle of the image display section that is located at the service position. Thus, the user can view images more easily. In order to achieve the adjustable angle of the image display section, the distal end of the rod-shaped component may be attached to the image display section by using, for example, a spherical joint or a universal joint.

It should be noted that the head mounted display device of the present invention may be either for one eye or for both eyes. When the head mounted display device of the present invention is for one eye, the image display section and its associated components including the driving mechanism are prepared only for the right eye or the left eye. When it is for the both eyes, a set of the image display section and its associated components including the driving mechanism is prepared for the right and left eyes, one for each.

Next, the image display device that the present inventor proposes is described.

An image display device disclosed in the present application forms a head mounted display device in combination with a pair of glasses having two temples with which the glasses are fixed in place to a part of the body of a user, when said image display device is attached to an attachment temple which is at least one of said two temples.

This image display device comprises an image display section adapted to be positioned at a service position in front of one eye of the user which is located closer to said attachment temple when said glasses are fixed to the part of the body of the user during the use of said head mounted display device which is formed by means of combining the said image display device with the glasses, said image display section having display means that allows the user to view said image with the one eye, said image being presented within a display area which overlaps the field of vision of the one eye, by means of directing an imaging light of a predetermined image to said one eye, and a body assembly is secured on one side of said attachment temple; said image display section being movable between a standby position in front of said body assembly and on the side of said attachment temple and said service position, in such a manner that said image display section is able to be positioned at said service position.

The head mounted display device that is formed by means of attaching the image display device to the glasses has an effect in that the user will have no trouble in positioning the image display section when he or she uses the head mounted display device, as in the case of the aforementioned head mounted display device. The image display device of the type described has an effect of making it possible to use the glasses as the head mounted display device. In particular, it is convenient that the user will have a choice of using the glasses as the normal glasses or as the head mounted display device, if the image display device of the present invention is designed so that it can be removably attached to the glasses. This allows fashionable glasses to be used like normal glasses without affecting on their appearance, under circumstances where fashionable appearance is preferred, which contributes to spreading head mounted display devices widely.

This image display device can be understood as the one in which a part of the aforementioned head mounted display device is modified so that it can be attached to glasses. Thus, the features of the aforementioned head mounted display device can basically be applied to the aforementioned image display device.

For example, in the image display device of the present invention, the position at which the image display section is positioned may be appropriately adjustable depending on, for example, differences among individuals for example.

The image display section in the image display device of the present invention may be intended to be moved either manually or automatically. In addition, in the image display device of the present invention, the image display section may be moved manually in one direction and automatically in the other direction, between the standby position and the service position. For example, said body assembly of the image display device according to the present invention may comprise a switch, and a driving mechanism that generates a driving force in response to the operation of said switch, said image display section being adapted to move from said standby position to said service position by means of the driving force generated by said driving mechanism when said switch is operated.

The driving mechanism of the image display device according to the present invention may be a component that uses electricity as the source of its driving force, such as a motor or an actuator.

In addition, the image display device of the present invention may comprise a rail extending from said standby position to said service position, the base of the rail being connected to said body assembly, and a bendable rod-shaped component which moves along the rail by means of the driving force generated by said driving mechanism, the rod-shaped component having said image display section attached thereto at a distal end thereof, said image display section being adapted to move from said standby position to said service position according to the movement of said rod-shaped component.

Said image display section in the image display device may be attached to the distal end of said rod-shaped component in such a manner that the angle formed between said image display section and said rod-shaped component can be varied. This makes it possible to change the angle of the image display section that is located at the service position. Thus, the user can view images more easily. In order to achieve the adjustable angle of the image display section, the distal end of the rod-shaped component may be attached to the image display section by using, for example, a spherical joint or a universal joint.

The glasses to which the image display device is to be attached may be either commercially available normal glasses or purpose-built special glasses. Purpose-built special glasses can facilitate exact positioning of the image display device with respect to the glasses by means of appropriately processing the temples of the glasses to which the image display device is to be attached. Accordingly, it is more convenient in order to provide more exact positioning of the image display section of the image display device.

A single aforementioned image display device may be used to form a head mounted display device for either the right eye or the left eye. Alternatively, a pair of such image display devices may be used for both the right and left eyes when a head mounted display device for both eyes is formed.

BEST MODE FOR CARRYING OUT THE INVENTION

A preferred embodiment of the present invention is described in detail below with reference to the drawings.

Description in this embodiment will be made about an image display device according to the present invention which forms, when being attached to glasses, a head mounted display device in the present invention together with the glasses. A pair of glasses to which the image display device is attached is an example of the head mounted display device of the present invention.

Figure 1:
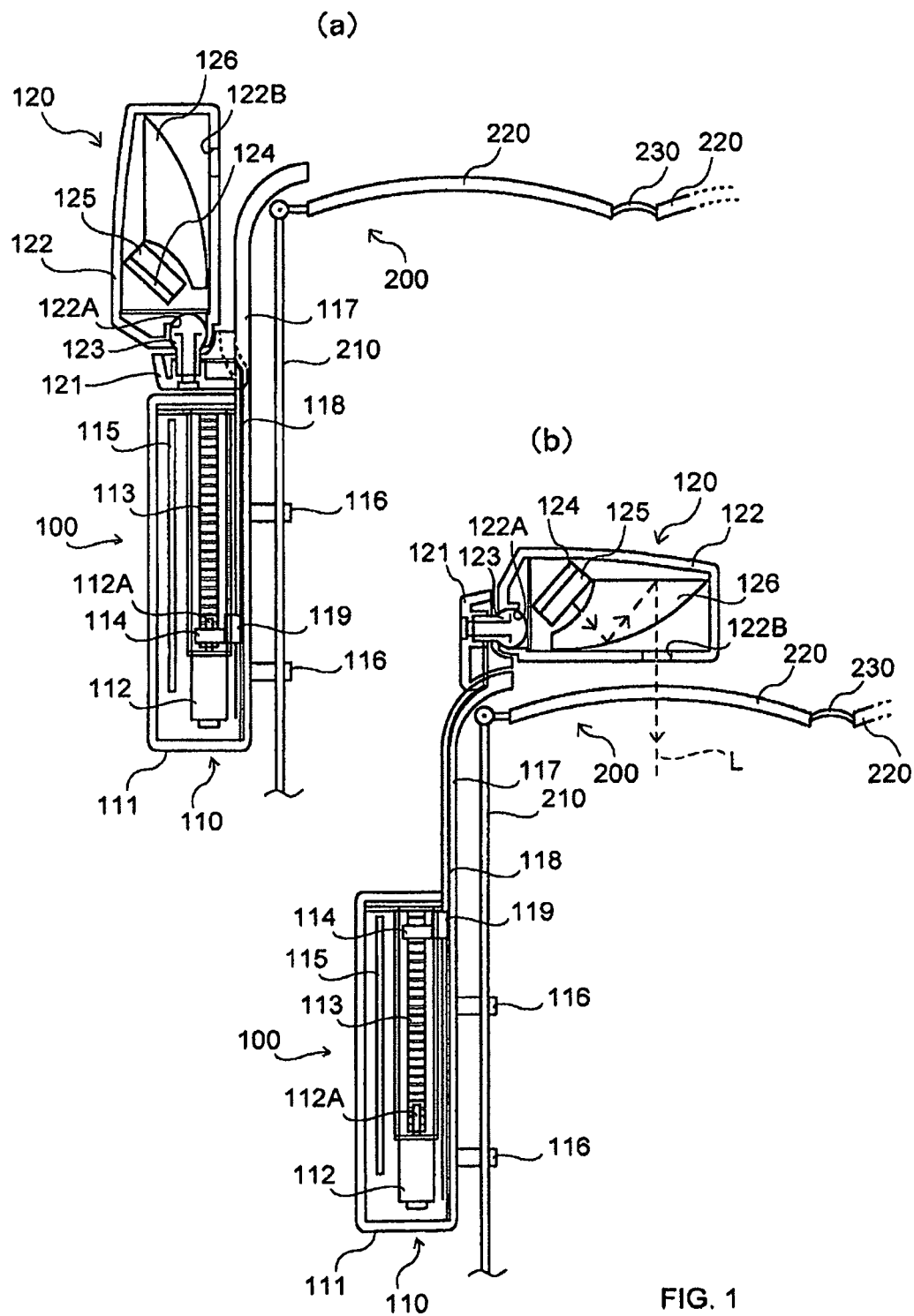
FIG. 1 is a top cross-sectional view of an image display device mounted on glasses, according to an embodiment of the present invention.

An image display device 100 of the present invention is structured as shown in FIG. 1. What is depicted by a reference numeral 200 in the figure is a pair of glasses to which the image display device 100 is attached.

The pair of glasses 200 comprises temples 210, lenses 220, and a bridge 230. There are two temples 210 and two lenses 220. There is only one bridge 230 and it connects the lenses 220. The temples 210 are for holding the glasses 200 in place on the head of a user. The glasses 200 are held in place on the head of the user by passing earpieces of the respective two temples 210 passed over or behind the ears of the user or, alternatively, passing two temples 210 on each side of the head of the user.

FIG. 1(a) shows a below-described image display section of the image display device 100 in its standby position while FIG. 1(b) shows the image display section in its service position. FIGS. 1(a) and (b) are top cross-sectional view in which the right half of the glasses is not illustrated.

The image display device 100 comprises a body assembly 110 and an image display section 120.

The body assembly 110 in this embodiment is made of a resin. It comprises a hollow body casing 111 which is an elongated rectangular parallelepiped in this embodiment. The body assembly 110 preferably has an elongated shape although it does not necessarily have a rectangular cross section because it is secured along the temples 210 of the glasses 200.

The body casing 111 of the body assembly 110 contains therein a motor 112, a worm gear 113, a movable member 114, and a body control board 115. In addition, provided outside the body casing 111 are a set of fixtures 116, a rail 117, a plate spring 118, and a connecting member 119.

The motor 112 is for generating a driving force. It is driven by electrical power supplied from a power source which is not shown (usually, a small button cell is used, and the button cell is placed within the body casing 111 but is not illustrated in this embodiment). The motor 112 has a motor shaft 112A and can rotate the motor shaft 112A in given directions.

The worm gear 113 is provided along the length of the body casing 111. The worm gear 113 is in the shape of a hollow cylinder having a threaded outer surface. An end of the aforementioned motor shaft 112A is embedded in the central position of the end surface of the worm gear 113 near the motor 112 and fixed therein. Thus, when the motor 112 is driven and rotates the motor shaft 112A, the worm gear 113 rotates accordingly.

The movable member 114 is in contact with the worm gear 113 and moves along the length of the worm gear 113 as the worm gear 113 rotates. The movable member 114 in this embodiment is provided in such a manner that it is in contact with the worm gear 113 above the worm gear 113 during the service of the head mounted display device that is formed by means of attaching the image display device 100 to the glasses 200. The movable member 114 has a threaded lower surface which engages with the threaded outer surface of the worm gear 113. With this, the movable member 114 can move along the length of the worm gear 113 as the worm gear 113 rotates. The direction of movement of the movable member 114 varies depending on the direction of rotation of the worm gear 113.

The body control board 115 is for controlling the motor 112. The body control board 115 has an antenna which is not shown. The antenna is adapted to accept a signal including information about the operation of a switch (not shown) which is provided on a remote controller (not shown). The signal is for directing the activation of the motor 112. It also includes information about in which direction the motor shaft 112A is going to be rotated. In response to the reception of this signal from the remote controller upon the operation of the switch, the body control board 115 drives the motor 112 according to the content of the signal. Although data is transmitted in a wireless manner from an external remote controller to the body control board 115 in this embodiment, this transmission can be achieved through a line. In addition, the switch in this embodiment is provided on a remote controller outside the body assembly 110. However, it may be provided on the body assembly 110 or on the image display section 120.

The fixtures 116 are for fixing the body assembly 110 and the temple 210 of the glasses 200. The fixing in this case may be achieved in a removable manner. The fixtures 116 in this embodiment are made of metal. Each fixture 116 in this embodiment is a combination of an outer member on the distal side of the temple 210 (farther away from the head of the user) and an inner member on the proximal side of the temple 210 (closer to the head of the user). The inner and outer members of the fixture 116 are opposed to each other and are protruded above and below the temple 210. The portions of the fixture 116 that are protruded above the temple 210 can be secured to each other with a small screw. With this structure, the temple 210 of the glasses 200 is sandwiched between and held by the inner and outer members of the fixture 116 to secure the body assembly 110 to the temple 210 of the glasses 200.

The exact structure of the fixture 116 is not specifically limited as long as it can fix the body assembly 110 to the temple 210 of the glasses 200. For example, when the temple 210 is made of a metal, the fixture 116 may be made by using a magnet which attracts the temple 210 towards the body assembly 110.

In addition, in the aforementioned example, the temple 210 of the glasses 200 has no special feature. However, the temple 210 may be modified in order to, for example, facilitate positioning of the body assembly 110 along the length of the temple 210 when a user tries to attach the body assembly 110 to the temple 210.

Figure 2:
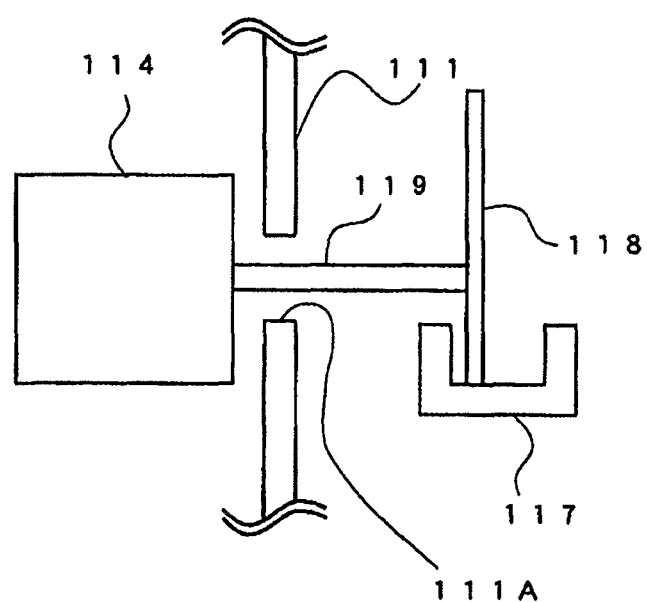
FIG. 2 is a view schematically illustrating the surrounding of a rail of the image display device shown in FIG. 1, seen from the end of the glasses temple.

The rail 117 has a generally U shape with an open top end as shown in FIG. 2 and has a groove. FIG. 2 is a view schematically illustrating the surrounding of the rail 117, seen from the end of the temple 210 of the glasses 200.

The rail 117 generally follows the temple 210 when the body assembly 110 is fixed to the temple 210. The end of it is curved gently towards the lens 220 of the glasses 200. The base of the rail 117 is fixed to the body assembly 110. The rail 117 is for guiding the plate spring 118.

The plate spring 118 is a so springy plate-shaped metal plate having a length that is about half the length of the rail 117. The plate spring 118 is inserted into the groove in the rail 117 so that the width direction of it comes perpendicular to the rail 117 as shown in FIG. 2. The base of the plate spring 118 is fixed to the connecting member 119.

The connecting member 119 is a component to connect the movable member 114 and the plate spring 118 and has a plate-like shape. The connecting member 119 has a portion that is connected to the plate spring 118 and exposed outside the body casing 111 through a slit 111A formed in the body casing 111 across a span corresponding to the length of the worm gear 113 within which the movable member 114 can move.

Next, the image display section 120 is described.

The image display section 120 has a connection unit 121. The connection unit 121 is for connecting the plate spring 118 and a display section casing 122 which will be described below.

The connection unit 121 is connected, at the base thereof, to the end of the plate spring 118. The connection unit 121 comprises a ball member 123 having a rod-shaped member and a spherical member provided at one end thereof.

The display section casing 122 in this embodiment is made of a resin and has a generally rectangular parallelepiped shape in this embodiment. The display section casing 122 is hollow. The display section casing 122 has a concave socket 122A formed in the surface near the base thereof which the spherical member at the end of the ball member 123 fits into. The display section casing 122 is fixed to the connection unit 121 by means of inserting the spherical member at the end of the aforementioned ball member 123 into the socket 122A. The ball member 123 of the connection unit 121 cooperates with the socket 122A in the display section casing 122 to form a spherical joint. Thus, the display section casing 122 can move with respect to the connection unit 121.

The display section casing 122 contains a display section control board 124, a display 125, and a free curved surface prism 126.

The display section control board 124 is for controlling the display screen on the display 125. The display section control board 124 supplies data for image representation to the display 125 to allow the display 125 to produce proper images.

The display section control board 124 receives the data about the image from outside the display section casing 122 and directs the display 125 to produce it. The display section control board 124 in this embodiment contains an antenna therein because it receives the data in a wireless manner. It should be noted that the display section control board 124 may receive the data through a line.

The image data that the display section control board 124 receives comes from, for example, a controller. More specifically, the display section control board 124 receives an image data that is supplied wirelessly from a memory or a hard disk provided within the controller or a TV image that is received wirelessly via a tuner provided within the controller.

The display 125 in this embodiment is a liquid crystal display. When the display 125 produces an image, the light associated with the image is transmitted to the free curved surface prism 126.

The free curved surface prism 126 is a prism which has curved sides defining a generally triangular cross section. The free curved surface prism 126 reflects the incident light two times inside it to direct it to a different direction and augments the incident light. Briefly, the free curved surface prism 126 has functions of a prism and a lens. The free curved surface prism 126 in this embodiment reflects the light from the display 125 along the path as shown in FIG. 1(b), to direct it to the eyes of the user. During this process, the light associated with the image is augmented, so that the user can view the image of an appropriately enlarged size on the display 125.

In order to make it possible to direct the light from the free curved surface prism 126 to the eyes of the user, the display section casing 122 has a bore 122B having an appropriate size.

Next, how this image display device 100 is used is described.

To use this image display device 100, first, the image display device 100 is attached to the glasses 200. As described above, fixing of the image display device 100 to the glasses 200 is achieved by means of holding the temple 210 of the glasses 200 with the fixture 116 provided on the body assembly 110 of the image display device 100 in the aforementioned manner. In this event, the fixture 116 is moved along the lengthwise direction of the temple 210 of the glasses 200 and the fixture 116 is fixed at an appropriate position on the lengthwise direction of the temple 210 of the glasses 200.

The image display device 100 may be fixed to both of the two temples 210 of the glasses 200 or, alternatively, it may be fixed to only one temple 210. The image display device 100 in this embodiment is fixed to both of the two temples 210 of the glasses 200.

Next, a user puts on the glasses 200 to which the image display device 100 is fixed. The user wears it by means of, in this embodiment, putting the two temples 210 on the ears of the user.

At this point, the image display section 120 of the image display device 100 is at a position shown in FIG. 1(a). The position where the image display section 120 is located corresponds to the standby position.

The user manipulates a switch on a controller which is not shown, in order to move the image display section 120 to the service position. The controller generates a signal to cause the image display section 120 to be moved and sends it to the body control board 115. The body control board 115 receives the signal via the antenna contained therein and lets the motor 112 be driven.

When the motor 112 is driven, the motor shaft 112A of the motor 112 rotates, which in turn rotates the worm gear 113.

Thus, the movable member 114 starts to move in the upward direction in FIG. 1(a). The movement of the movable member 114 also moves the connecting member 119 connected to the movable member 114, the plate spring 118 having the base connected to the connecting member 119, and the image display section 120 attached to the distal end of the plate spring 118, in the upward direction in FIG. 1(a).

As described above, the rail 117 is bent at the distal end thereof towards the front of the lenses 220 of the glasses 200 close to the temple 210 to which the image display device 100 having that rail 117 is attached. Thus the distal end of the plate spring 118 bends towards the lenses 220 of the glasses 200 when the movable member 114 reaches the distal end (top in FIG. 1) of the worm gear 113 shown in FIG. 1(b). As a result, the image display section 120 is shifted at about 90 degrees from the standby position of the image display section 120 to a position generally parallel to the lenses 220 of the glasses 200. The plate spring 118 is springy as described above, and is forced against the inner surface of the groove in the rail 117 (more exactly, the part of the inner surface of the groove that defines the outer periphery of the curve) so that it cannot extend beyond the periphery of the curve of the rail 117, in the state shown in FIG. 1(b). As a result, the plate spring 118 can stably keep the shape as shown in FIG. 1(b). This makes it possible to hold the image display section 120 steadily. The position where the image display section 120 is located in FIG. 1(b) is the service position. The image display section 120 is automatically positioned to the service position by the operation of the switch.

The service position of the image display section 120 may be varied when a user wants to. This can be achieved readily by means of storing information about the distance along which the movable member 114 is moved when the image display section 120 is moved to its service position, in a memory (not shown) in the body control board 115 or in a memory (not shown) contained in a controller.

In this state, the user adjusts the angle of the display section casing 122 of the image display section 120 by using the aforementioned spherical joint. This adjustment is less likely to be a burden to the user because it is not necessary to do so frequently after once adjusted.

The adjustment may be performed while viewing an image because it is preferable that the angle of the display section casing 122 be an angle at which the image can be viewed easily.

In this state, the user operates the controller to send the data about the image to the image display section 120.

The display section control board 124 in the image display section 120 receives the data through the antenna contained therein and sends it to the display 125. The display 125 produces an image according to that data. The light associated with the image presented on the display 125 exits the display 125, travels through the free curved surface prism 126, and reaches the eyes of the user. As a result, the user can use the glasses 200 to which the image display device 100 is attached, as a head mounted display device. The optical path of the light exiting the display 125 is depicted by the symbol L in FIG. 1(b).

When the user wants to finish viewing images, he or she operates a switch on a controller which is not shown in order to stop transmittance of the data from the controller to the image display section 120 and to move the image display section 120 back to its standby position. The controller generates a signal to cause the image display section 120 to be moved and sends it to the body control board 115. The body control board 115 receives the signal through the antenna contained therein and drives the motor 112.

When the motor 112 is driven, the motor shaft 112A of the motor 112 rotates in the direction opposite to the aforementioned direction, which in turn rotates the worm gear 113 in the direction opposite to the aforementioned direction. This triggers the movement of the movable member 114 in the downward direction in FIG. 1(b). The movement of the movable member 114 also moves the connecting member 119, the plate spring 118, and the image display section 120 in the downward direction in FIG. 1(b). This returns the image display section 120 to the standby position shown in FIG. 1(a).

The user may either take off the glasses or keep wearing the glasses. The user has free choice about it.

While the motor 112 in this embodiment is used as a driving mechanism in the present invention, something that can generate a driving force without using electricity, such as a spring or a coil, may be used in place of the motor 112 as the driving mechanism in the present invention.

In addition, in this embodiment, the image display section 120 is automatically moved between its service position and its standby position by means of changing the direction of rotation of the motor shaft 112A of the motor 112. However, the image display section 120 may be moved automatically only in one direction, i.e., in either from the service position to the standby position or from the standby position to the service position. In such a case, the image display section 120 is manually moved when it is moved in the direction not automatically moved.

The invention claimed is:

1. A head mounted display device comprising:
a main body;
an image display section,
the main body having a shape of a pair of glasses having two temples with which the glasses are fixed in place to a part of the body of a user, the image display section being attached to an attachment temple which is at least one of said two temples,
said image display section being adapted to be positioned at a service position in front of one eye of the user which is located closer to said attachment temple when said main body is fixed to the part of the body of the user during the use of said head mounted display device, said image display section having display means that allows the user to view said image with the one eye, said image being presented within a display area which overlaps the field of vision of the one eye, by means of directing an imaging light of a predetermined image to said one eye,
said image display section being movable between a standby position on the side of said attachment temple and said service position, in such a manner that said image display section is able to be positioned at said service position;
a switch;
a driving mechanism that generates a driving force in response to the operation of said switch,
said image display section being adapted to move from said standby position to said service position by means of the driving force generated by said driving mechanism when said switch is operated;
a rail that is fixed relative to the attachment temple, wherein the rail has a first end portion at said standby position that follows the attachment temple, and a second end portion at said service position that is disposed adjacent to the one eye of the user and is curved toward the one eye of the user; and a bendable rod-shaped component which moves along the rail by means of the driving force generated by said driving mechanism, wherein the bendable rod-shaped component has a proximal end portion and a distal end portion, and wherein the distal end portion is closer to the user's face than the proximal end portion, the rod-shaped component having said image display section attached thereto at the distal end portion thereof, wherein the distal end portion of the rod-shaped component is bent by the curved second end portion of the rail as the rod-shaped component moves along the rail to the service portion, and said image display section being adapted to move from said standby position to said service position according to the movement of said rod-shaped component.

2. The head mounted display device as claimed in claim 1, wherein said image display section is attached to the distal end portion of said rod-shaped component in such a manner that the angle formed between said image display section and said rod-shaped component can be varied.

3. An image display device which forms a head mounted display device in combination with a pair of glasses having two temples with which the glasses are fixed in place to a part of the body of a user, when said image display device is attached to an attachment temple which is at least one of said two temples, said image display device comprising:

an image display section adapted to be positioned at a service position in front of one eye of the user which is located closer to said attachment temple when said glasses are fixed to the part of the body of the user during the use of said head mounted display device which is formed by means of combining the said image display device with the glasses, said image display section having display means that allows the user to view said image with the one eye, said image being presented within a display area which overlaps the field of vision of the one eye, by means of directing an imaging light of a predetermined image to said one eye, and a body assembly is secured on one side of said attachment temple;

said image display section being movable between a standby position in front of said body assembly and on the side of said attachment temple and said service position, in such a manner that said image display section is able to be positioned at said service position, wherein said body assembly comprises a switch, and a driving mechanism that generates a driving force in response to the operation of said switch, said image display section being adapted to move from said standby position to said service position by means of the driving force generated by said driving mechanism when said switch is operated, the image display device further comprising a rail that is fixed relative to the attachment temple, wherein the rail has a first end portion at said standby position that follows the attachment temple, and a second end portion at said service position that is disposed adjacent to the one eye of the user and is curved toward the one eye of the user, wherein a base of the rail is connected to said body assembly, and a bendable rod-shaped component which moves along the rail by means of the driving force generated by said driving mechanism, wherein the bendable rod-shaped component has a proximal end portion and a distal end portion, and wherein the distal end portion is closer to the user's face than the proximal end portion, the rod-shaped component having said image display section attached thereto at the distal end portion thereof, wherein the distal end portion of the rod-shaped component is bent by the curved second end portion of the rail as the rod-shaped component moves along the rail to the service portion, and said image display section being adapted to move from said standby position to said service position according to the movement of said rod-shaped component.

4. The image display device as claimed in claim 3, wherein said image display section is attached to the distal end portion of said rod-shaped component in such a manner that the angle formed between said image display section and said rod-shaped component can be varied.

5. The head mounted display device as claimed in claim 1, wherein the rod-shaped component comprises a plate spring.

6. The head mounted display device as claimed in claim 1, further comprising:

a movable member driven by the driving mechanism;

a body casing enclosing the movable member, wherein the rod-shaped component is disposed outside of the body casing; and a connecting member connected to the movable member inside the body casing and to the proximal end portion of the rod-shaped component outside of the body casing, wherein the body casing defines a slit within which the connecting member moves to move the rod-shaped component along the rail.

7. The head mounted display device as claimed in claim 1, wherein the distal end portion of the rod-shaped component is unbent in the standby position and bent in the service position.

8. The head mounted display device as claimed in claim 1, wherein the rod-shaped component has a straight portion that remains straight in the standby and service positions, wherein in the standby position the display area faces in a first direction approximately perpendicular to the straight portion of the rod-shape component, and wherein in the service position the display area faces in a second direction approximately parallel to the straight portion of the rod-shaped component.

9. The head mounted display device as claimed in claim 1, wherein, when viewed along a longitudinal axis of the rail, the rail has a U shape defining a groove and the rod-shaped component is disposed in the groove.

10. The head mounted display device as claimed in claim 1, wherein the rail has a first length from a distal end of the first end portion to a distal end of the second end portion, wherein the rod-shaped component has a second length, and wherein the second length is about half of the first length.

11. The image display device as claimed in claim 3, wherein the rod-shaped component comprises a plate spring.

12. The image display device as claimed in claim 3, further comprising:

a movable member driven by the driving mechanism;

a body casing enclosing the movable member, wherein the rod-shaped component is disposed outside of the body casing; and a connecting member connected to the movable member inside the body casing and to the proximal end portion of the rod-shaped component outside of the body casing, wherein the body casing defines a slit within which the connecting member moves to move the rod-shaped component along the rail.

13. The image display device as claimed in claim 3, wherein the distal end portion of the rod-shaped component is unbent in the standby position and bent in the service position.

14. The image display device as claimed in claim 3, wherein the rod-shaped component has a straight portion that remains straight in the standby and service positions, wherein in the standby position the display area faces in a first direction approximately perpendicular to the straight portion of the rod-shape component, and wherein in the service position the display area faces in a second direction approximately parallel to the straight portion of the rod-shaped component.

15. The image display device as claimed in claim 3, wherein, when viewed along a longitudinal axis of the rail, the rail has a U shape defining a groove and the rod-shaped component is disposed in the groove.

16. The image display device as claimed in claim 3, wherein the rail has a first length from a distal end of the first end portion to a distal end of the second end portion, wherein the rod-shaped component has a second length, and wherein the second length is about half of the first length.

17. An image display device configured for use on a pair of glasses having two temples, the image display device comprising:

a rail configured to attach to a temple of the pair of glasses, wherein, when attached to the temple, the rail has a first end at a side of a head of a user wearing the pair of glasses and a second end at the face of the user, wherein the second end is curved toward a center of the user's face;

a bendable rod-shaped component that moves along the rail, wherein the bendable rod-shaped component has a proximal end portion and a distal end portion, and wherein the distal end portion is closer to the user's face than the proximal end portion; and an image display section attached to the distal end portion of the bendable rod-shaped component and configured to be positioned at a service position in front of the user's face and a standby position at the side of the head of the user, wherein, in the service position, the curved second end of the rail bends the distal end portion of the bendable rod-shape component toward the center of the user's face.

18. The image display device as claimed in claim 17, wherein the distal end portion of the bendable rod-shaped component is unbent in the standby position.

* * * * *